(12) United States Patent
Fukasawa et al.

(10) Patent No.: US 8,997,183 B2
(45) Date of Patent: Mar. 31, 2015

(54) OUTGOING EMAIL CHECK SYSTEM, CHECK DATA PROVIDING APPARATUS, CHECK DATA INSPECTING APPARATUS, AND OUTGOING EMAIL CHECK METHOD

(75) Inventors: Ryota Fukasawa, Kanagawa (JP); Aya Higashizono, Kanagawa (JP); Natsu Hashisaka, Kanagawa (JP); Masayoshi Okamoto, Kanagawa (JP); Kiyoshi Kurashige, Kanagawa (JP); Hiroshi Tsuda, Kawasaki (JP); Yoshinori Katayama, Kawasaki (JP); Fumihiko Kozakura, Kawasaki (JP); Shinichi Mochizuki, Kanagawa (JP)

(73) Assignees: Fujitsu Limited, Kawasaki (JP); Fujitsu Social Science Laboratory Limited, Kawasaki (JP)

( * ) Notice: Subject to any disclaimer, the term of this patent is extended or adjusted under 35 U.S.C. 154(b) by 850 days.

(21) Appl. No.: 12/662,089

(22) Filed: Mar. 30, 2010

(65) Prior Publication Data
US 2011/0067102 A1    Mar. 17, 2011

(30) Foreign Application Priority Data
Sep. 11, 2009   (JP) ................................ 2009-211008

(51) Int. Cl.
*H04L 29/06* (2006.01)
*G06Q 10/10* (2012.01)

(52) U.S. Cl.
CPC .................................. *G06Q 10/107* (2013.01)
USPC .......................................................... 726/4

(58) Field of Classification Search
CPC ........ H04W 4/12; H04W 4/14; H04L 12/581; H04L 12/585; H04L 51/32; H04L 63/1408; G06F 21/56; G06Q 10/107; G06Q 50/01; G08B 5/22
USPC ........................ 726/4, 22; 709/206; 715/752
See application file for complete search history.

(56) References Cited

U.S. PATENT DOCUMENTS 6,321,267 B1 * 11/2001 Donaldson .................... 709/229
7,660,861 B2 *  2/2010 Taylor ........................... 709/206
7,917,943 B1 *  3/2011 Dreymann et al. ............... 726/4

FOREIGN PATENT DOCUMENTS

JP    2006-59297    3/2006
JP    2007-293635   11/2007
JP    2009-56615    3/2009

OTHER PUBLICATIONS

U.S. Appl. No. 12/659,459, filed Mar. 9, 2010, Ryota Fukasawa, et al., Fujitsu Limited and Fujitsu Social Science Laboratory Limited.
Japanese Notice of Reasons for Refusal mailed Dec. 18, 2012 in corresponding Japanese Patent Application No. 2009-211008.

* cited by examiner

*Primary Examiner* — Ali Abyaneh

(57) ABSTRACT

To allow inspecting whether a security check of a planned outgoing email is finished in an outgoing email check system, a check data providing apparatus 2 of an outgoing email check system 100 stores check information distributed from a check information management apparatus 1, appends check data generated based on the check information to a header of a checked planned outgoing email, and transmits the email to an email transmitting apparatus 9. A check data inspecting apparatus 3 stores the check information distributed from the check information management apparatus 1, inspects the check data extracted from the planned outgoing email received from the email transmitting apparatus 9 based on the check information, determines that the transmission is permitted when the check data of the planned outgoing email matches the check information, and determines that the transmission is rejected when the check data does not match the check information. The email transmitting apparatus 9 executes a transmission process only for the planned outgoing email for which the transmission is permitted.

9 Claims, 14 Drawing Sheets

| ADDRESS OF SENDER 1 | TIME-LIMITED PARAMETER 1 | FLAG 1 |
|---|---|---|
| ADDRESS OF SENDER 2 | TIME-LIMITED PARAMETER 2 | FLAG 2 |
| ... | ... | ... |
| ADDRESS OF SENDER k | TIME-LIMITED PARAMETER k | FLAG k |

FIG.3A

| DEVICE VERSION NUMBER 1 |
|---|
| DEVICE VERSION NUMBER 2 |
| ... |
| DEVICE VERSION NUMBER m |

FIG.3B

| POLICY VERSION INFORMATION 1 |
|---|
| POLICY VERSION INFORMATION 2 |
| ... |
| POLICY VERSION INFORMATION n |

FIG.3C

| TIME-LIMITED PARAMETER |

FIG.4A

| POLICY VERSION INFORMATION |
|---|
| DEVICE VERSION NUMBER |

FIG.4B

...
X-MailChecker-Check: CHECKER 2009-08-03 18:45:28 ver1.3-SSL1.0a
Message-ID: 4A76B1B5.6010106@aaa.com
Date: Mon, 03 Aug 2009 18:45:25 +0900
From: aaa@aaa.com
...

FIG.8A

...
X-MailChecker-Check: 8a237d69ff2e035128b09
Message-ID: 4A76B1B5.6010106@aaa.com
Date: Mon, 03 Aug 2009 18:45:25 +0900
From: aaa@aaa.com
...

FIG.8B

| SENDER ADDRESS 1 | RECEIVER ADDRESS 1 | TIME 1 | REASON 1 | PRESENCE/ABSENCE OF NOTIFICATION 1 |
|---|---|---|---|---|
| SENDER ADDRESS 2 | RECEIVER ADDRESS 2 | TIME 2 | REASON 2 | PRESENCE/ABSENCE OF NOTIFICATION 2 |
| ... | ... | ... | ... | ... |
| SENDER ADDRESS p | RECEIVER ADDRESS p | TIME p | REASON p | PRESENCE/ABSENCE OF NOTIFICATION p |

FIG.11

OUTGOING EMAIL CHECK SYSTEM, CHECK DATA PROVIDING APPARATUS, CHECK DATA INSPECTING APPARATUS, AND OUTGOING EMAIL CHECK METHOD

CROSS-REFERENCE TO RELATED APPLICATION(S)

This application is based upon and claims the benefit of priority of the prior Japanese Patent Application number 2009-211008, filed on Sep. 11, 2009, the entire contents of which are incorporated herein by reference.

FIELD

The present invention relates to an outgoing email check system, a check data providing apparatus, a check data inspecting apparatus, an outgoing email check method, a check data providing program, and a check data inspection program. More specifically, the present invention relates to a processing technique for inspecting whether an email to be transmitted is a target of a predetermined security check process before an email transmission process.

BACKGROUND

As the email system is widely used, incidents of information leakage by email produce serious effects. According to statistics of Japanese Information Processing Development Corporation (for example, fiscal years 2005 to 2007), the leading cause of incidents of information leakage is wrong transmission due to wrong addressing of mail, fax, and email. The leakage incidents caused by wrong transmission of email account for about 5.7% of all leakage incidents.

Most of the incidents of information leakage through email transmission are caused by human errors, such as carelessly setting wrong addresses (destination addresses) of outgoing email. In general, the sender does not notice the careless mistake, and the mistake is recognized when the receiver of the wrong transmission points out the mistake. Therefore, one incident may cause significantly adverse effects. There is a trend of expansion in the use of the email system, and the incident ratio is expected to rise. Therefore, it is more important to prevent wrong transmissions caused by human errors such as careless mistakes.

Conventionally, a mechanism is provided as a prevention measure of wrong transmission of email, in which risk information is presented to the sender before the email transmission to warn the sender to check the address and pay attention. For example, there is a known system, in which a security policy is registered in advance, and when a planned outgoing email violates the security policy, risk information is presented to the sender for warning.

Another example of a conventional method includes a system, in which a white list including reliable addresses registered in advance is prepared, and an address checking process is prevented when the address of an outgoing email is registered in the white list to thereby reduce the load of the sender in the security check process.

Another example of a conventional method includes a system, in which a transmission log of email is stored, an intimacy between a sender and a planned receiver as well as a threshold of availability of transmission according to the intimacy are stored based on the transmission log, words used in the text of an outgoing email are analyzed, the analysis result is determined by the threshold according to the intimacy of the receiver of the planned outgoing email, and the availability of transmission is checked.

PRIOR ART DOCUMENT

Patent Literature

The following are documents describe technical backgrounds of the discussed embodiment:

[Patent Literature 1] Japanese Patent Laid-Open No. 2007-293635

[Patent Literature 2] Japanese Patent Laid-Open No. 2006-059297

In a wrong transmission prevention measure of email, the level of an information security check process and the convenience or the operation comfort of an email transmission system are, so to say, in a trade-off relationship. If the security level of a security check process is high, i.e. strict, the convenience or the operation comfort of the system is reduced, and the user feels inconvenient. As a result, the check measure may be meaningless, and in spite of the user's intention, information that needs to be protected may not be protected. If the security level is too low, necessary checking is not sufficiently performed, and the security effects are reduced. Therefore, it is important to balance the convenience and the information security level to maximize the effects of the security measure.

The conventional methods of security measure cause problems, such as decrease in freshness of risk information, inappropriateness of check level, management load of white list, and load of information asset inventory, which reduce the effectiveness of the measure as the operation is continued.

The applicant of the present application has particularly focused on the increase in the incidents of information leakage by email transmission and invented an email wrong transmission preventing apparatus, which serves as a security function for solving the problems in the conventional security measure, to prevent wrong transmission of email to prevent information leakage by human errors during email transmission operations (see Japanese Patent Application No. 2009-056615).

The email wrong transmission preventing apparatus applied by the applicant of the present application determines a potential risk of an email before email transmission and presents risk information to the email sender to provide an autonomous email filtering function for warning the email sender. The feedback of the risk information from the apparatus allows the email sender to effectively reduce wrong transmissions of email, as long as the email transmissions are through the email wrong transmission preventing apparatus.

However, the following improvements are further requested to smoothly carry out the security management in relation to email.

(1) Management Load in Operation of Security Management

Due to the characteristics of the wrong transmission of email, if even one incident occurs in an organization, not only are important information assets actually leaked, but also the approach of the security management of the organization may be in question. More specifically, the wrong transmission of email may lead to a loss of credibility of customers, a loss of business opportunities, etc. Therefore, to completely perform the security management of the email wrong transmission prevention, a check process function, or for example, the email wrong transmission preventing apparatus, based on the security management needs to be surely and thoroughly implemented and operated on individual personal computers in the entire organization.

However, if each user is in charge of the implementation operation of the email wrong transmission preventing apparatus, the implementation may not be thorough, such as when the user forgets implementing the email wrong transmission preventing apparatus on a newly installed personal computer. After the implementation of the email wrong transmission preventing apparatus, if there is a wrong setting of the apparatus, a missed update of a policy version, a missed version upgrade of the apparatus, etc. caused by a careless mistake, the email transmission process is executed without a warning issued based on a security policy intended by the manager, i.e., based on a policy version or device version permitted to use. As a result, the compliance with the email wrong transmission prevention measure may be difficult in the entire organization.

The manager can periodically check the condition of the implementation of the email wrong transmission preventing apparatus and force the user to implement the apparatus. However, the load of the manager may increase.

(2) Unauthorized Avoidance of Security Check

It is difficult to figure out the accurate use status when there is an action of avoiding a process by a check processing apparatus, such as the email wrong transmission preventing apparatus, of the security management by an unauthorized method. As described, the manager can patrol and check the implementation of the email wrong transmission preventing apparatus in individual personal computers, or implement a management tool of information technique-related assets to systematically check the implementation of the apparatus in the individual personal computers.

However, the email transmitting apparatus that processes email transmissions operates independently from the email wrong transmission preventing apparatus and performs received email transmissions regardless of whether the process of email wrong transmission prevention is executed. Therefore, when there is an email transmission action that intentionally avoids the email wrong transmission preventing apparatus, the email is transmitted without a warning issued based on the security management. Such a condition increases the risk of wrong transmission of email, and the compliance with the email wrong transmission prevention measure is difficult in the entire organization.

SUMMARY

An outgoing email check system disclosed as an aspect of the present invention is for inspecting the execution of a security check process for an outgoing email, the outgoing email check system includes a security check executing apparatus; a check data providing apparatus; and a check data inspecting apparatus. The security check executing apparatus, the check data providing apparatus, and the check data inspecting apparatus operate or comprise as follows.

The security check executing apparatus of the outgoing email check system acquires a planned outgoing email to be transmitted to an email transmitting apparatus to execute a predetermined security check process for the acquired planned outgoing email.

The check data providing apparatus includes a sender-by-sender check information storage unit that stores sender-by-sender check information including an arbitrary value allocated to a sender; an email receiving unit that receives the planned outgoing email for which the security check process is executed; a check data generating unit that generates check data based on the sender-by-sender check information; a check data appending unit that appends the generated check data to a header of the planned outgoing email received by the email receiving unit; and an email transmitting unit that transmits the planned outgoing email with the appended check data to the email transmitting apparatus.

The check data inspecting apparatus comprises: an inspection check information storage unit that stores the sender-by-sender check information and inspection check information including version information indicating the security check executing apparatus and the check data providing apparatus as targets of transmission permission; a transmission rejection information storage unit that stores transmission rejection information indicating the planned outgoing email for which the transmission is rejected; a check data inspecting unit that acquires the planned outgoing email from the email transmitting apparatus, extracts the check data from the header of the acquired planned outgoing email, inspects the extracted check data based on the sender-by-sender check information and the inspection check information to determine permission/rejection of transmission of the acquired planned outgoing email, and returns the acquired planned outgoing email to the email transmitting apparatus when the transmission of the acquired planned outgoing email is determined to be permitted; and a transmission rejection recording unit that generates transmission rejection information of the acquired planned outgoing email and that records the information in the transmission rejection information storage unit when the transmission of the acquired planned outgoing email is determined to be rejected.

A check data providing apparatus disclosed as another aspect of the present invention is constituted in the same way as the check data providing apparatus included in the transmission email system.

A check data inspecting apparatus disclosed as another aspect of the present invention is constituted in the same way as the check data inspecting apparatus included in the outgoing email check system.

An outgoing email check method disclosed as another aspect of the present invention is for inspecting the execution of a security check process for a planned outgoing email, the outgoing email check method executed by a first computer and a second computer, the first computer includes a sender-by-sender check information storage unit that stores sender-by-sender check information including an arbitrary value allocated to a sender, the second computer comprising: an inspection check information storage unit that stores the sender-by-sender check information stored in the sender-by-sender check information storage unit and inspection check information including version information indicating the security check executing apparatus and the check data providing apparatus as targets of transmission permission; and a transmission rejection information storage unit that stores transmission rejection information indicating the planned outgoing email for which the transmission is rejected. The outgoing email check method comprises the following processing steps. More specifically, the outgoing email check method comprises: a processing step by the first computer to acquire a planned outgoing email to be transmitted to an email transmitting apparatus to execute a predetermined security check process for the acquired planned outgoing email; a processing step by the first computer to generate check data based on the sender-by-sender check information; a processing step by the first computer to append the generated check data to a header of the planned outgoing email for which the predetermined security check process is executed; a processing step by the first computer to transmit the planned outgoing email with the appended check data to the email transmitting apparatus; a processing step by the second computer to acquire the planned outgoing email from the email transmitting apparatus; a processing step by the second computer to extract the check data from the header of the acquired planned outgoing email and inspect the extracted check data based on the inspection check information to determine permission/rejection of transmission of the acquired planned outgoing email; a processing step by the second computer to return the acquired planned outgoing email to the email transmitting apparatus when the transmission of the acquired planned outgoing email is determined to be permitted; and a processing step by the second computer to generate transmission rejection information of the acquired planned outgoing email and record the information in the transmission rejection information storage unit when the transmission of the acquired planned outgoing email is determined to be rejected.

A check data providing program disclosed as another aspect of the present invention is for causing a computer included in the outgoing email check system to execute the processes executed by the check data providing apparatus.

A check data inspection program disclosed as another aspect of the present invention is for causing a computer included in the outgoing email check system to execute the processes executed by the check data inspecting apparatus.

The object and advantage of the invention will be realized and attained by means of the elements and combinations particularly pointed out in the claims. It is to be understood that both the foregoing general description and the following detailed description are exemplary and explanatory and are not restrictive of the invention, as claimed.

According to the outgoing email check system, the email transmitting apparatus that transmits email can transmit only an email, to which a security check process, such as an email wrong transmission prevention process, based on the security management is applied, and the operation of the security management in relation to the email transmission can be more completely performed.

Furthermore, setting the check information can prevent email transmission by an unauthorized transmission operation using check data of another person or check data during the transmission in the past.

BRIEF DESCRIPTION OF DRAWINGS

FIGS. 3A, 3B and 3C are diagrams illustrating examples of check information stored in a management check information storage unit of a check information management apparatus;

FIGS. 4A and 4B are diagrams illustrating examples of information stored in a sender-by-sender check information storage unit;

FIGS. 8A and 8B are diagrams illustrating examples of check data;

FIG. 11 is a diagram illustrating an example of transmission rejection information stored in a transmission rejection information storage unit;

DESCRIPTION OF EMBODIMENT

Figure 1:
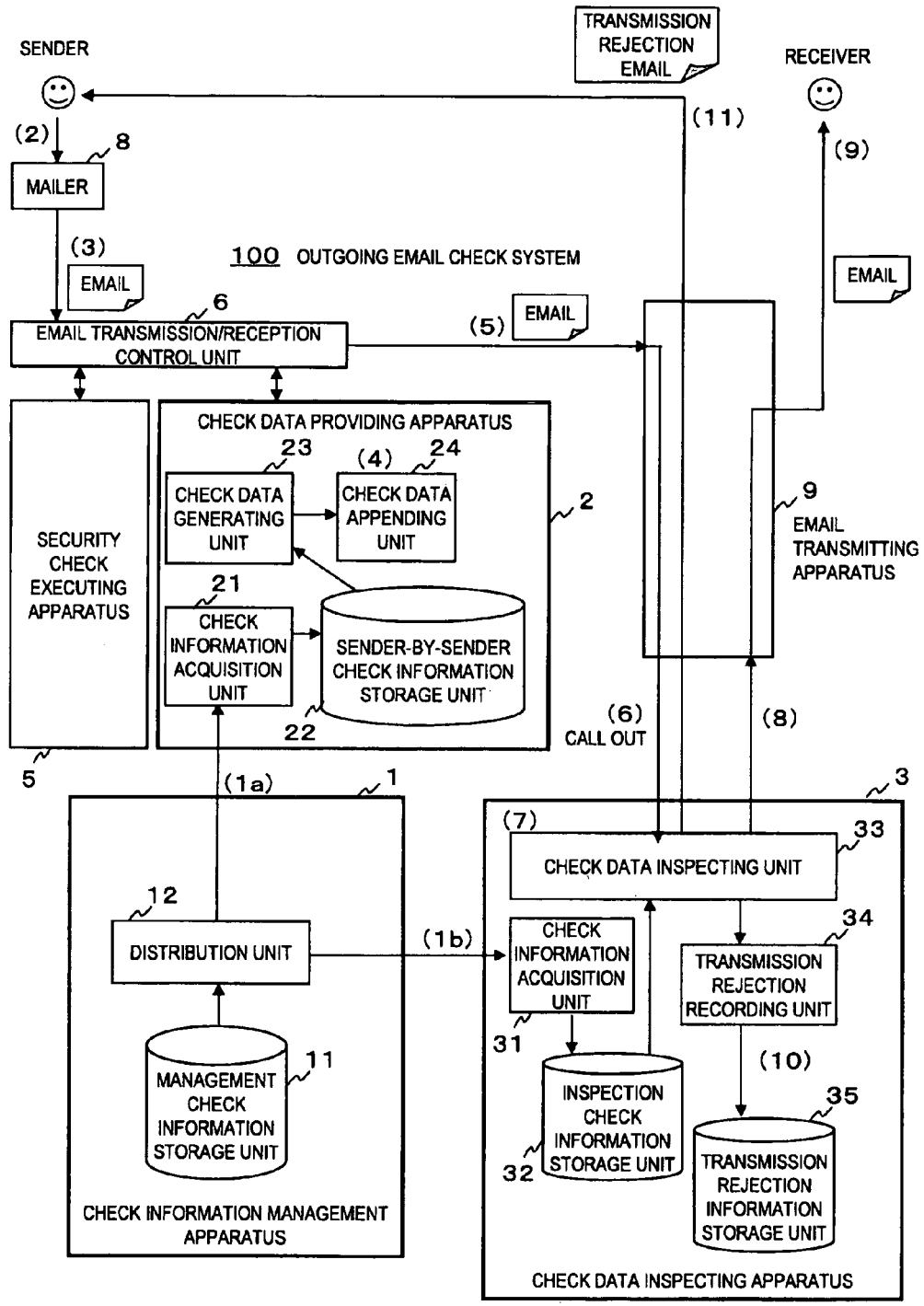
FIG. 1 is a diagram illustrating an example of a configuration of an outgoing check system disclosed as an embodiment of the present invention.

FIG. 1 is a diagram illustrating an example of a configuration of an outgoing email check system disclosed as an embodiment of the present invention.

An outgoing email check system 100 illustrated in FIG. 1 is a system for realizing processing functions of applying a predetermined security check process to an email to be transmitted (planned outgoing email) that is created by a mailer 8 and that is a target of the security check process; providing check information indicating that the security check process is applied to the planned outgoing email; and inspecting whether the check information is appropriately provided to a planned outgoing email received by an email transmitting apparatus 9 that executes an email transmission process to set only the planned outgoing email including appropriately provided check information as a target of the email transmission process.

The email check system 100 comprises a check information management apparatus 1, a check data providing apparatus 2, a check data inspecting apparatus 3, a security check executing apparatus 5, and an email transmission/reception control unit 6.

The check information management apparatus 1 is an apparatus that manages and distributes information necessary to check the planned outgoing email.

The check data providing apparatus 2 is an apparatus that provides check information which indicates that the security check process is applied to the planned outgoing email.

The check data inspecting apparatus 3 is an apparatus that inspects whether the check information is appropriately provided to the planned outgoing email received by the email transmitting apparatus 9 configured to execute the email transmission process and that determines the permission/rejection of transmission.

The security check executing apparatus 5 executes, for example, an email wrong transmission prevention process executed by the email wrong transmission preventing apparatus described in the email wrong transmission preventing apparatus (Japanese Patent Application No. 2009-056615).

A function unit that executes an email wrong transmission prevention process calculates memory ratios of the addresses of emails in a transmission log of the user (sender) by a model expression in which the memory ratio declines over time, compiles the memory ratios of the emails for each destination to obtain weights, and records the weights in a user weight list. When a planned outgoing email is received, the function unit compares the weight of the destination of the planned outgoing email obtained with reference to the user weight list with a predetermined threshold and determines that the destination is reliable only when the weight is over the threshold. On the other hand, the function unit displays an address check screen on the computer of the user to prompt the user to check the address when the destination is not reliable. The function unit transmits the planned outgoing email to the email transmitting apparatus when the destination of the planned outgoing email is reliable or checked.

The email transmission/reception control unit 6 receives the planned outgoing email outputted by the mailer 8 to transfer the email to the security check executing apparatus 5, receives the planned outgoing email, to which the security check process is applied, from the security check executing apparatus 5 to transfer the email to the check data providing apparatus 2, and receives the planned outgoing email, to which check data is appended, from the check data providing apparatus 2 to transmit the email to the email transmitting apparatus 9.

The email transmitting apparatus 9 transmits the planned outgoing email created by the mailer 8 in the email transmission process by SMTP.

In the present embodiment, the check data providing apparatus 2, the security check executing apparatus 5, and the email transmission/reception control unit 6 of the outgoing email check system 100 are provided in the computer that includes the mailer 8 and that is used by the user (sender).

The check data inspecting apparatus 3 is provided in the email transmitting apparatus 9 to realize a preprocessing function of the email transmitting apparatus 9.

The check information management apparatus 1 is provided as an independent computer capable of data communication with check data providing apparatus 2 and the check data inspecting apparatus 3.

The check information management apparatus 1 comprises a management check information storage unit 11 and a distribution unit 12.

The management check information storage unit 11 stores sender-by-sender check information to be distributed to the check data providing apparatus 2 and the check data inspecting apparatus 3 as well as inspection check information to be distributed to the check data inspecting apparatus 3.

The sender-by-sender check information is information including a time-limited parameter that is a unique arbitrary value with expiration date and that is allocated to each user.

The inspection check information is information including version information indicating the content of the security check process applied to the planned outgoing email. In the present embodiment, the inspection check information includes policy version information indicating the version of the security check process executed by the security check executing apparatus 5 and device version information indicating the version of the main body of the security check executing apparatus 5. One or both the policy version information and the device version information are used as the version information.

The expiration date denotes that the period, which is information that the transmission is determined to be permitted, is limited in the check data inspection by the check data inspecting apparatus 3.

The distribution unit 12 distributes the sender-by-sender check information stored in the management check information storage unit 11 to the check data providing apparatus 2 and distributes the sender-by-sender check information and the inspection check information to the check data inspecting apparatus 3.

The check data providing apparatus 2 comprises a check information acquisition unit 21, a sender-by-sender check information storage unit 22, a check data generating unit 23, and a check data appending unit 24.

The check information acquisition unit 21 acquires the sender-by-sender check information transmitted from the check information management apparatus 1 and stores the information in the sender-by-sender check information storage unit 22.

The sender-by-sender check information storage unit 22 stores the sender-by-sender check information acquired from the check information management apparatus 1.

The check data generating unit 23 generates check data based on the sender-by-sender check information of the sender-by-sender check information storage unit 22.

The check data appending unit 24 appends the check data generated by the check data generating unit 23 to a predetermined location of the header of the planned outgoing email obtained from the email transmission/reception control unit 6.

The check data inspecting apparatus 3 comprises a check information acquisition unit 31, an inspection check information storage unit 32, a check data inspecting unit 33, a transmission rejection recording unit 34, and a transmission rejection information storage unit 35.

The check information acquisition unit 31 acquires the sender-by-sender check information and the inspection check information from the check information management apparatus 1 and stores the information in the inspection check information storage unit 32.

The inspection check information storage unit 32 stores the inspection check information acquired from the check information management apparatus 1.

The check data inspecting unit 33 acquires the planned outgoing email, extracts the check data from the header of the acquired planned outgoing email, and inspects the extracted check data based on the sender-by-sender check information and the inspection check information of the inspection check information storage unit 32 to determine the permission/rejection of transmission of the planned outgoing email.

More specifically, the check data inspecting unit 33 acquires the inserted check data from the predetermined location of the header of the planned outgoing email transmitted to the email transmitting apparatus 9. When the check data cannot be acquired from the planned outgoing email, the check data inspecting unit 33 determines the planned outgoing email as "transmission rejected".

The check data inspecting unit 33 compares data included in the check data acquired from the header of the planned outgoing email with data corresponding to the sender-by-sender check information and the inspection check information of the inspection check information storage unit 32 and determines that the planned outgoing email as "transmission permitted" when the data match. On the other hand, when the data do not match, the check data inspecting unit 33 determines that the planned outgoing email as "transmission rejected".

If the check data acquired from the header of the planned outgoing email is encoded, the check data inspecting unit 33 executes a decoding process corresponding to the encoding process of the check data generating unit 23 and compares the data included in the decoded check data with data corresponding to the sender-by-sender check information and the inspection check information of the inspection check information storage unit 32.

The check data inspecting unit 33 notifies the email transmitting apparatus 9 of the "transmission permitted" of the planned outgoing email. Alternatively, the check data inspecting unit 33 returns the planned outgoing email determined as "transmission permitted" to the email transmitting apparatus 9.

If the acquired planned outgoing email is determined as "transmission rejected", the check data inspecting unit 33 extracts sender information from the planned outgoing email and uses the extracted transmitter information to notify the sender of the planned outgoing email that the transmission of the planned outgoing email is rejected. The check data inspecting unit 33 further returns the "transmission rejected" of the planned outgoing email to the email transmitting apparatus 9. In this case, the email transmitting apparatus 9 does not execute the transmission process of the planned outgoing email for which the transmission is rejected.

If the check data inspecting unit 33 determines the acquired planned outgoing email as "transmission rejected", the transmission rejection recording unit 34 extracts predetermined information from the planned outgoing email, for which the transmission is rejected, to generate transmission rejection information and stores the transmission rejection information in the transmission rejection information storage unit 35.

The transmission rejection information storage unit 35 stores information indicating the planned outgoing email for which the transmission is rejected.

A summary of an operation of the outgoing email check system 100 will now be described.

Step (1*a*): Triggered by a predetermined time interval or a predetermined event, the distribution unit 12 of the check information management apparatus 1 transmits the sender-by-sender check information stored in the management check information storage unit 11 to the check data providing apparatus 2. The distributed sender-by-sender check information includes unique corresponding time-limited parameters, etc. allocated to the users. The check information acquisition unit 21 receives the sender-by-sender check information and stores the information in the sender-by-sender check information storage unit 22.

The device version information (number) and the policy version information are held by the security check executing apparatus 5 in advance.

Step (1*b*): Triggered by a predetermined time interval or a predetermined event, the distribution unit 12 of the check information management apparatus 1 transmits the sender-by-sender check information and the inspection check information stored in the management check information storage unit 11 to the check data inspecting apparatus 3. The distributed inspection check information includes policy version information and device version number. The sender-by-sender check information (such as time-limited parameters) of all users is also distributed.

The check information acquisition unit 31 receives the sender-by-sender check information and the inspection check information and stores the information in the inspection check information storage unit 32.

Step (2): The sender creates an email by the mailer 8 of the computer of the sender to perform a transmission operation.

Step (3): When the mailer 8 transmits the planned outgoing email, the email transmission/reception control unit 6 receives the planned outgoing email and transfers the email to the security check executing apparatus 5. The security check executing apparatus 5 applies the email wrong transmission prevention process to the planned outgoing email. The check data providing apparatus 2 is called out when the process is completed.

The email transmission/reception control unit 6 then receives the planned outgoing email, to which the security check process is applied, from the security check executing apparatus 5 and transfers the email to the check data providing apparatus 2. The email transmission/reception control unit 6 further transfers the policy version information and the device version number obtained from the security check executing apparatus 5 to the check data providing apparatus 2. The check information acquisition unit 21 of the check data providing apparatus 2 receives the planned outgoing email, the policy version information, and the device version number.

In another example of processing, the security check executing apparatus 5 may directly transfer the planned outgoing email, to which the security check process is applied, to the check data providing apparatus 2 without passing through the email transmission/reception control unit 6.

Step (4): The check data generating unit 23 uses the sender-by-sender check information (time-limited parameters) corresponding to the user (email address of the sender) stored in the sender-by-sender check information storage unit 22 to generate check data.

Alternatively, the check data generating unit 23 may extract information, such as sender information (sender email address) of a control command part (SMTP command part) and message identification information (message ID) of the header, from the planned outgoing email and use the information extracted from the planned outgoing email and the time-limited parameters extracted from the planned outgoing email to execute the encoding process or the hash process to generate the check data.

Subsequently, the check data appending unit 24 appends the generated check data to a predetermined location of the header of the planned outgoing email.

Step (5): The email transmission/reception control unit 6 transmits the planned outgoing email with appended check data to the email transmitting apparatus 9.

Step (6): The check data inspecting apparatus 3 is called out when the email transmitting apparatus 9 receives the planned outgoing email, and the check data inspecting unit 33 of the check data inspecting apparatus 3 acquires the planned outgoing email.

Step (7): When the planned outgoing email is acquired, the check data inspecting unit 33 extracts the sender information (sender email address) from the SMTP command part of the planned outgoing email and the check data from the header.

If the check data extracted from the planned outgoing email is encoded or hashed, the check data inspecting unit 33 executes a decoding process corresponding to the process executed by the check data generating unit 23 and generates check data in a plain text.

The check data inspecting unit 33 then extracts, from the inspection check information storage unit 32, the sender-by-sender check information (time-limited parameters) corresponding to the sender information (sender email address) extracted from the planned outgoing email and compares the check data obtained from the planned outgoing email with the time-limited parameters extracted from the inspection check information storage unit 32.

Step (8): If the check data match, the check data inspecting unit 33 determines that the planned outgoing email is "transmission permitted" and returns the "transmission permitted" to the email transmitting apparatus 9.

Step (9): As the email transmitting apparatus 9 applies a transmission process to the planned outgoing email after the reception of the "transmission permitted" from the check data inspecting apparatus 3, the planned outgoing email reaches the receiver (receiver email address).

Step (10): When the check data do not match, the check data inspecting unit 33 determines the planned outgoing email as "transmission rejected" and stores the transmission rejection information, which is information indicating the planned outgoing email, in the transmission rejection information storage unit 35.

Step (11): The check data inspecting unit 33 notifies the sender that the transmission of the planned outgoing email is rejected. For example, the check data inspecting unit 33 generates a "transmission rejected email" to the sender and transmits the email to the sender through the email transmitting apparatus 9.

Figure 2A:
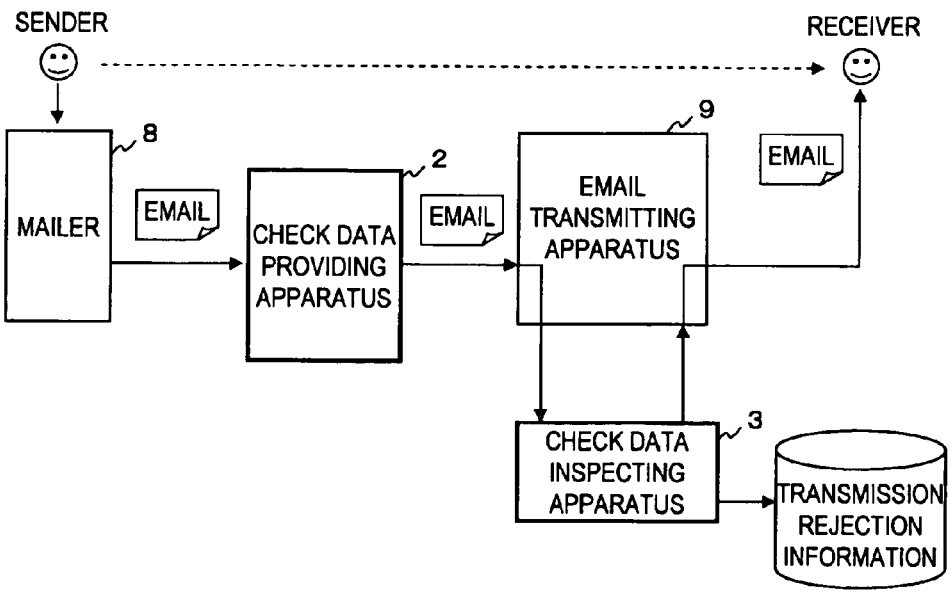
FIGS. 2A and 2B are diagrams for explaining processing results of the outgoing email check system disclosed as an embodiment of the present invention.
Figure 2B:
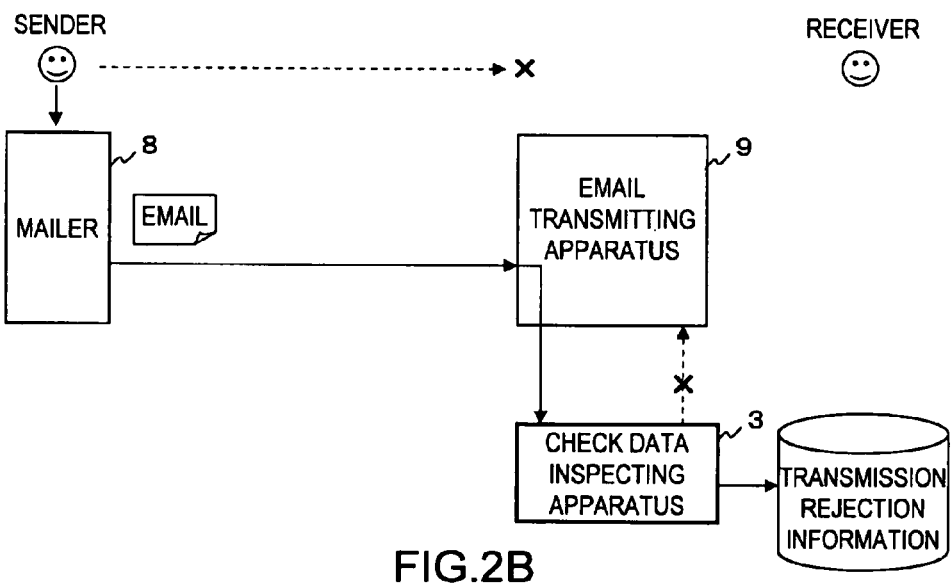

FIGS. 2A and 2B are diagrams for explaining processing results of the outgoing email check system 100.

If the computer used by the user (sender) includes the security check executing apparatus 5, etc. as well as the mailer 8, the check data providing apparatus 2 that cooperates with the security check executing apparatus 5 appends the check data corresponding to the sender to the header of the planned outgoing email.

Therefore, as illustrated in FIG. 2A, when the planned outgoing email reaches the email transmitting apparatus 9, and the check data inspecting apparatus 3 inspects the check data of the planned outgoing email, correct check data can be detected from the planned outgoing email. As a result, the email is determined as "transmission permitted", and the planned outgoing email is transmitted to the receiver.

If the user (sender) uses a computer of another person, the check data providing apparatus 2 that cooperates with the security check executing apparatus 5 implemented along with the mailer 8 appends check data corresponding to the email address of an authorized user different from the sender to the header of the planned outgoing email.

Therefore, when the planned outgoing email reaches the email transmitting apparatus 9, and the check data inspecting apparatus 3 inspects the check data of the planned outgoing email, correct check data cannot be detected from the planned outgoing email, and the email is determined as "transmission rejected". As a result, the planned outgoing email is not transmitted to the receiver, and transmission rejection information related to the planned outgoing email is recorded.

If the computer used by the user (sender) does not include the security check executing apparatus 5, etc., the process of the check data providing apparatus 2 cooperating with the security check executing apparatus 5 is not executed, and the check data corresponding to the sender is not appended to the header of the planned outgoing email.

Therefore, as illustrated in FIG. 2B, when the planned outgoing email reaches the email transmitting apparatus 9, and the check data inspecting apparatus 3 inspects the check data of the planned outgoing email, correct check data cannot be detected from the planned outgoing email, and the email is determined as "transmission rejected". As a result, the planned outgoing email is not transmitted to the receiver, and transmission rejection information related to the planned outgoing email is recorded.

A more specific process of the outgoing email check system 100 will now be described as an embodiment.

FIGS. 3A, 3B and 3C are diagrams illustrating examples of check information stored in the management check information storage unit 11 of the check information management apparatus 1.

FIG. 3A is a diagram illustrating an example of a time-limited parameter table storing the time-limited parameter for each user of the sender-by-sender check information.

In the time-limited parameter table, a time-limited parameter and a flag to be used are recorded for each email address used by the sender as the user.

The time-limited parameters are data, in which the values are rewritten after a predetermined period, such as one hour/one day, so that the parameters are effective only in the predetermined period. The flag indicates the presence/absence of the "transmission rejected" determined in the past for the planned outgoing email with the corresponding email address as the sender.

FIG. 3B is a diagram illustrating an example of a device version table storing the device version information, which is part of the inspection check information.

The device version table records zero or more pieces of information (device version number) for identifying the versions of usable main bodies of the security check executing apparatus 5. If the device version table records a plurality of device version numbers, a range of usable versions of the security check executing apparatus 5 can be selected. The device version numbers of the device version table allow the invalidation of a process by the security check executing apparatus 5 of an old version and the concurrent operation of the security check executing apparatus 5 of an old version and a new version.

FIG. 3C is a diagram illustrating an example of a policy version table storing the policy version information, which is part of the inspection check information.

The policy version table records zero or more pieces of information (policy version information) for identifying usable versions of the policy of the security management. In principle, the use of the latest policy of the security check is required. However, to prevent the email transmission rejection that may occur due to a delay in the acquisition of the policy of the check data providing apparatus 2, a plurality of pieces of policy version information are recorded when an operation by the plurality of policy versions is allowed.

FIGS. 4A and 4B are diagrams illustrating examples of information stored in the sender-by-sender check information storage unit 22.

When the check information acquisition unit 21 notifies the distribution unit 12 of the check information management apparatus 1 of information indicative of the sender, for example, the address of the sender, the distribution unit 12 refers to the time-limited parameter table illustrated in FIG. 3 to acquire the time-limited parameter corresponding to the address of the sender notified from the check data providing apparatus 2 and transmits the parameter to the check information acquisition unit 21.

As illustrated in FIG. 4A, the check information acquisition unit 21 stores the time-limited parameter acquired from the distribution unit 12 in the sender-by-sender check information storage unit 22. Every time the time-limited parameter is acquired, the check information acquisition unit 21 updates the time-limited parameter stored in the sender-by-sender check information storage unit 22.

As illustrated in FIG. 4B, the sender-by-sender check information storage unit 22 further holds the device version number and the policy version information obtained from the security check executing apparatus 5.

The distribution unit 12 transmits the user time-limited parameter table, which is sender-by-sender check information of all users, as well as the policy version table and the device version table, which are inspection check information, stored in the management check information storage unit 11 to the check data inspecting apparatus 3. The inspection check information storage unit 32 of the check data inspecting apparatus 3 holds the information of the tables illustrated in FIGS. 3A to 3C.

Figure 5:
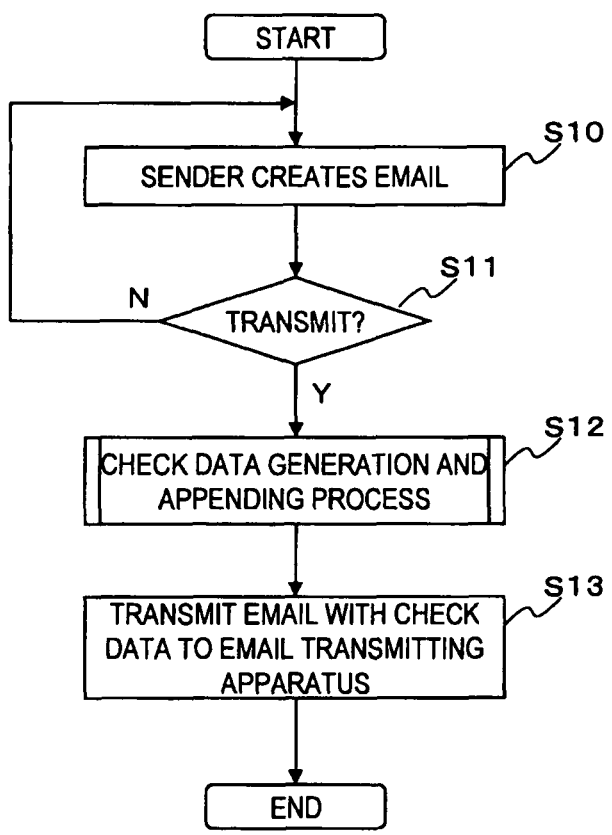
FIG. 5 is a diagram illustrating a flow of a check data providing process.

FIG. 5 is a diagram illustrating a flow of a check data providing process.

In the computer of the user, the user (sender) creates an email by the mailer 8 (step S10), and when there is an instruction of transmission (Y of step S11), the process proceeds to step S12.

In a process of step S12, the check data providing apparatus 2 executes a check data generation and appending process on the assumption that the security check process of the planned outgoing email is executed. Details of the check data generation and appending process will be described below.

The check data providing apparatus 2 then transmits the planned outgoing email provided with the check data to the email transmitting apparatus 9 (step S13).

Figure 6:
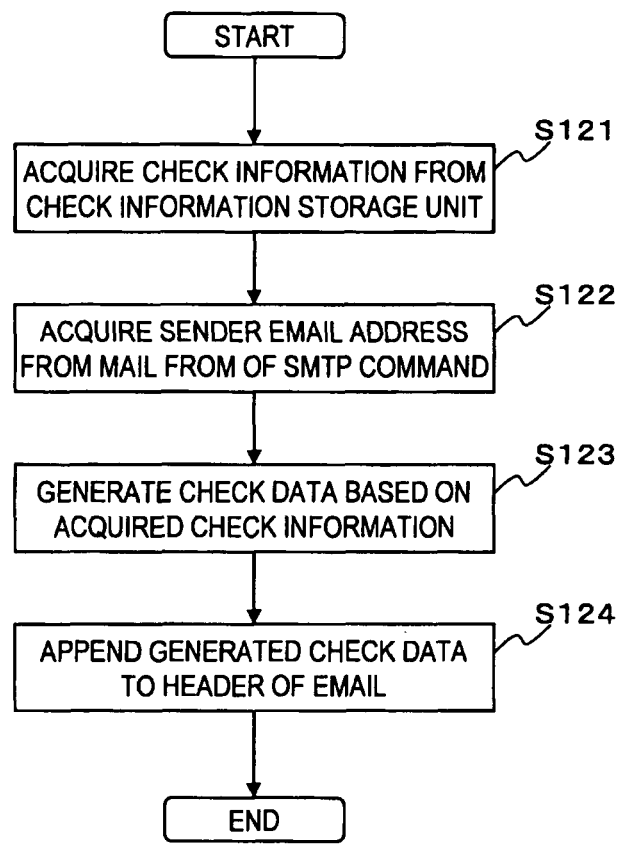
FIG. 6 is a diagram illustrating a more detailed processing flow of a check data generation and appending process (step S12)

FIG. 6 is a diagram illustrating a more detailed processing flow of the check data generation and appending process (step S12).

The check information acquisition unit 21 acquires all or part of the policy version information, the device version number, and the time-limited parameter (hereinafter, simply "check information") from the sender-by-sender check information storage unit 22 (step S121).

The check data generating unit 23 acquires the sender email address from the SMTP command of the planned outgoing email (step S122).

Figure 7:
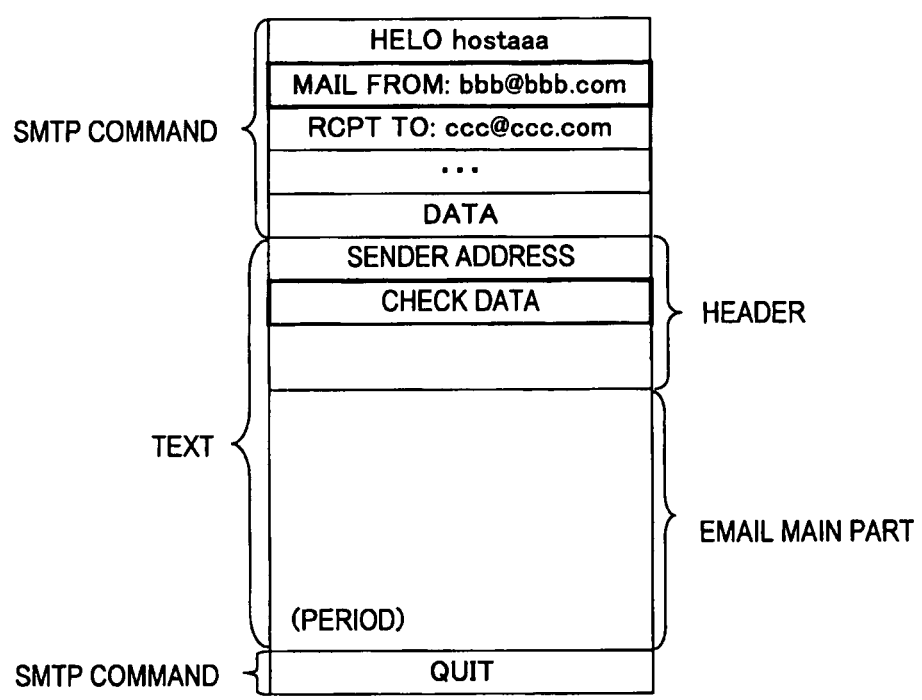
FIG. 7 is a diagram illustrating an example of a data configuration of a planned outgoing email.

FIG. 7 is a diagram illustrating an example of a data configuration of the planned outgoing email.

As illustrated in FIG. 7, the planned outgoing email is constituted by the SMTP command and the text, and the text is constituted by the header (email header) and the email main part. The check data generating unit 23 extracts the sender email address (bbb@bbb.com) set in "MAIL FROM" of the SMTP command.

The check data generating unit 23 then generates check data based on the acquired check information (step S123), and the check data appending unit 24 appends the generated check data to a predetermined location of the header of the planned outgoing email illustrated in FIG. 7 (step S124).

The check data generating unit 23 can generate the check data from the check information to execute one of a process of writing the generated check data in the header of the planned outgoing email (plain text check data appending process) and a process of encoding the generated check data and writing the encoded check data in the header of the planned outgoing email (encoded check data appending process).

[Plain Text Check Data Appending Process]

FIG. 8A is a diagram illustrating an example in which the check data that is not encoded is appended to the header.

For example, the time-limited parameter is defined as "date (DATE) and time (TIME) of generation of check data", and the following information is stored as the check information of the sender-by-sender check information storage unit 22.

Time-limited parameter: 2009-8-03 18:45:28
Device version number: 1.3
Policy version: SSL1.0a In another example, the time-limited parameter may be an arbitrary number or value of character (for example, 885139).

The check data generating unit 23 generates a check value in the following configuration.

<DATE(YYYY-MM-DD)><TIME(24hh:mm:ss)>
"ver"<Device Version Number>"-"<Policy Version">
"CHECKER 2009-8-03 18:45:28 ver1.3-SSL1.0a"

The check data appending unit 24 then writes the check data in the following configuration in the header.

<Check Header>":"<Check Value>
<X-MailChecker-Check>:CHECKER    2009-8-03 18:45:28 ver1.3-SSL1.0a

[Encoded Check Data Appending Process]

Figure 9:
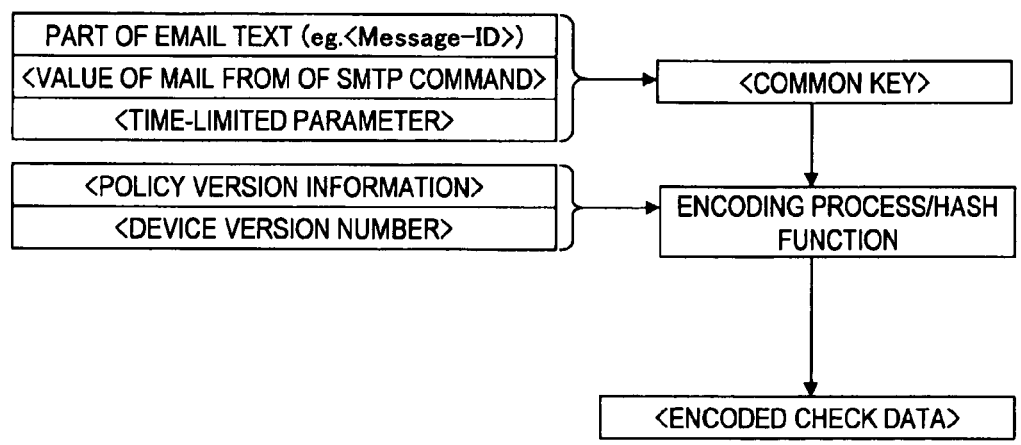
FIG. 9 is a diagram for explaining an example of an encoding process or a hash process executed in a check data generating unit and information to be used.

FIG. 9 is a diagram for explaining an example of the encoding process or hash process executed by the check data generating unit 23 and the information to be used.

The check data generating unit 23 combines part of the planned outgoing email, for example, one or a plurality of message identification information of the header, setting information of MAIL FROM of the SMTP command part (sender email address), and a time-limited parameter included in the check information, and uses the combination as a common key. The check data generating unit 23 encodes or hashes one or both of the policy version information and the device version number included in the check information to generate encoded check data.

The check data generating unit 23 applies one of the following encoding processes and the hash process to the plain text check data, such as character string "CHECKER ver1.3-SSL1.0a", including the policy version information and the device version number to generate the encoded check data.

(1) First Encoding Process

The check data generating unit 23 executes an encoding process by a known common key encoding method as a first encoding process. The sender email address is used as a common key.

The check data generating unit 23 extracts the sender email address (bbb@bbb.com) from the SMTP command part of the planned outgoing email to set the address as the common key and encodes the generated check value.

As illustrated in FIG. 8B, the check data appending unit 24 writes the following encoded check data in the header.

<X-MailChecker-Check>:8a237d69ff2e035128b09

As a result of the first encoding process, it is impossible to copy the encoded check value generated for the email transmitted by an email transmission operation by another person and disguise as another person to transmit the email.

(2) Second Encoding Process

The check data generating unit 23 executes a second encoding process that is an encoding process, in which the sender email address and the message identification information are common keys.

The check data generating unit 23 uses the sender email address (bbb@bbb.com) extracted from the SMTP command of the planned outgoing email and a set value (4A76B1B5.6010106@bbb.com) of <Message-ID> as identification information of email extracted from the header as common keys to encode the generated check value.

As illustrated in FIG. 8B, the check data appending unit 24 writes the encoded check data to the header.

As a result of the second encoding process, it is impossible to copy the encoded check value generated for the email transmitted by an email transmission operation by another person to disguise as another person to transmit the email, or to copy the encoded check value generated for the email transmitted by the user in the past to perform unauthorized email transmission.

(3) Third Encoding Process

The check data generating unit 23 executes a third encoding process that is an encoding process, in which the sender email address, the message identification information, and the time-limited parameter are the common keys.

In this case, the check information management apparatus 1 sets an arbitrary value generated at random as a time-limited parameter and distributes the parameter every predetermined time or trigger. The random generation of the time-limited parameter is carried out by known random number generation processing means.

The check data generating unit 23 uses the sender email address (bbb@bbb.com) extracted from the SMTP command part of the planned outgoing email, the set value (for example, 4A76B1B5.6010106@bbb.com) of <Message-ID> as the identification information of email extracted from the header, and the time-limited parameter (for example, 885139)

included in the check information of the sender-by-sender check information storage unit 22 as common keys to encode the generated check data.

As illustrated in FIG. 8B, the check data appending unit 24 writes the encoded check data in the header.

As a result of the third encoding process, it is impossible to disguise as another person to transmit email or to reuse the email transmission by the user in the past. Furthermore, the unauthorized transmission is more difficult than in the second encoding process, and intentional unauthorized transmission can be prevented.

(4) Hash Process

The check data generating unit 23 uses the sender email address, the message identification information, the time-limited parameter, or a combination of these as common keys and uses a hash function with key (such as HMAC), which is a one-way function irreversible to the check value, to execute a hash process.

The check data generating unit 23 uses the common keys as described in the encoding processes of (1) to (3) to execute the hash process with a changed security level.

As illustrated in FIG. 8B, the check data appending unit 24 writes the hashed check data (hash value) in the header.

In the processes of (1) to (4), the check data generating unit 23 may generate the encoded check data by applying the encoding process or the hash process to a character string including the date/time information indicating the generation date/time of the planned outgoing email, such as plain text check data "CHECKER ver1.3-SSL1.0a" and "CHECKER 2009-8-03 18:45:28 ver1.3-SSL1.0a". Such date/time information has a meaning equivalent to the message identification information provided to the planned outgoing email. Therefore, including the date/time information allows preventing the unauthorized transmission, such as using data of another person to disguise as the sender to transmit email or reusing the data of the user in the past to transmit email, and the security level can be improved.

After the processes of (1) to (4), the check data inspecting unit 33 executes a decoding process corresponding to the executed encoding process or hash process to obtain a check value in a plain text and sets the check value in a plain text as a target of comparison with the sender-by-sender check information and the inspection check information stored in the inspection check information storage unit 32.

Figure 10:
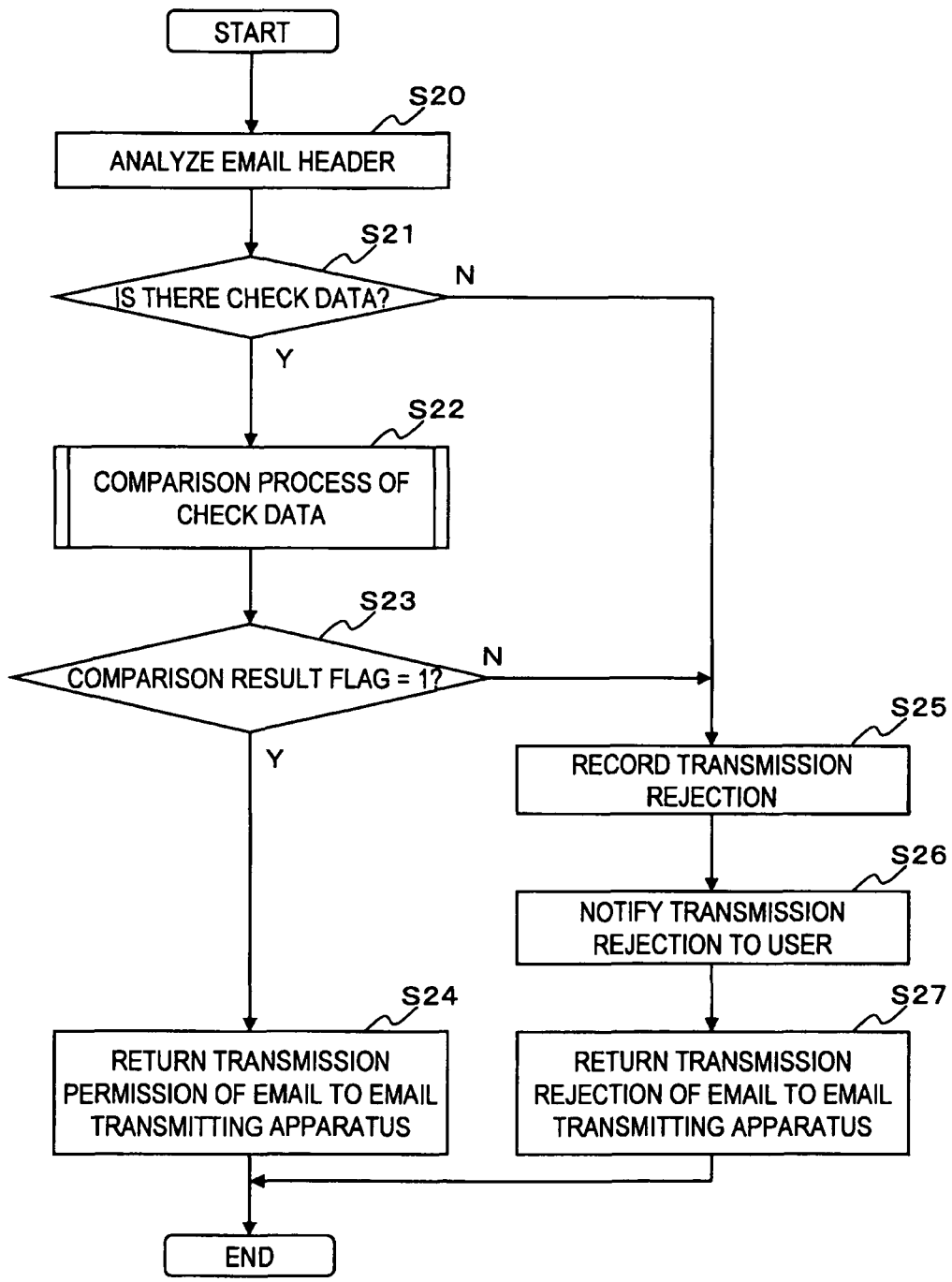
FIG. 10 is a diagram illustrating a flow of a check data inspection process.

FIG. 10 is a diagram illustrating a flow of a check data inspection process.

The check data inspection process starts when the email transmitting apparatus receives the planned outgoing email.

The check data inspecting unit 33 of the check data inspecting apparatus 3 analyzes the header of the planned outgoing email acquired from the email transmitting apparatus 9 (step S20) and checks whether there is check data in the header (step S21). If there is check data in the header (Y of step S21), the check data inspecting unit 33 executes a comparison process of check data (step S22). If there is no check data in the header (N of step S21), the process proceeds to step S25.

If the result of the comparison process of the check data is comparison result flag=1 (transmission permitted) (Y of step S23), the check data inspecting unit 33 returns the "transmission permitted" of the planned outgoing email to the email transmitting apparatus 9 (step S24). If the result of the comparison process of the check data is not comparison result flag=1 (N of step S23), the process proceeds to step S25.

In a process of step S25, the transmission rejection recording unit 34 generates transmission permission/rejection information related to the planned outgoing email determined as "transmission rejected" and records the information in the transmission rejection information storage unit 35 (step S25). The check data inspecting unit 33 notifies the user of the transmission rejection of the planned outgoing email (step S26) and returns the transmission rejection of the planned outgoing email to the email transmitting apparatus 9 (step S27).

FIG. 11 is a diagram illustrating an example of transmission rejection information recorded in the transmission rejection information storage unit 35.

The transmission rejection information includes information of sender email address, receiver address, time, reason, and presence/absence of notification.

The sender email address denotes an email address of the sender extracted from the SMTP of the planned outgoing email determined as "transmission rejected". The receiver address denotes receiver information (receiver email address) stored in the header. The time denotes a time indicating the execution time of the check data inspection process. The reason denotes a reason of the transmission rejection, and for example, the absence of check data and the mismatch of the extracted check data are recorded. The presence/absence of notification denotes information indicating whether the notification of the transmission rejection of the planned outgoing email is transferred to the sender.

Figure 12:
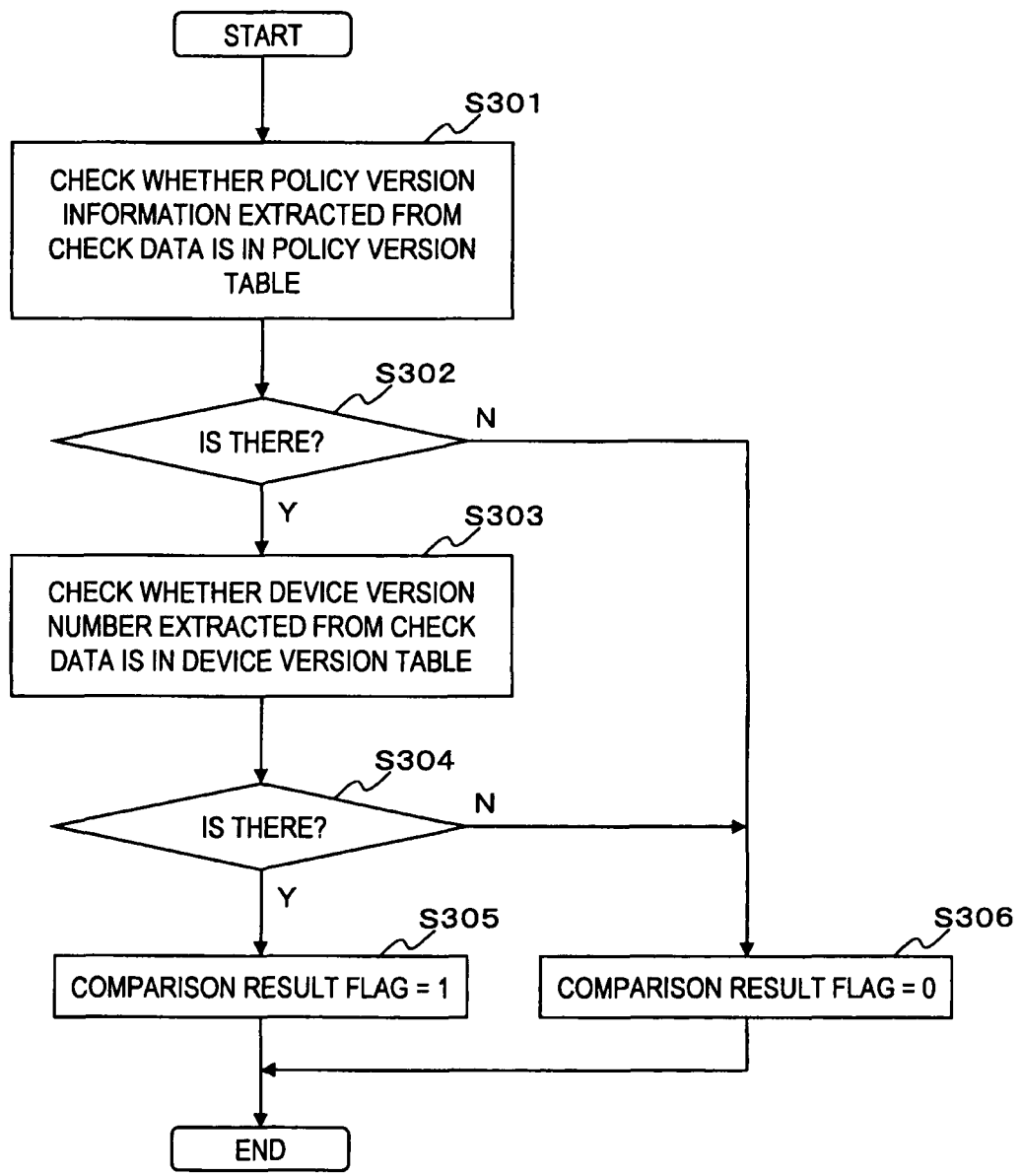
FIG. 12 is a more detailed processing flow diagram of a comparison process of check data (step S22) when the check data is not encoded.

FIG. 12 is a more detailed processing flow diagram of the comparison process of check data (step S22) when the check data is not encoded.

The check data inspecting unit 33 checks whether the policy version information extracted from the check data of the planned outgoing email is in the policy version table stored in the inspection check information storage unit 32 (step S301). If the extracted policy version information is in the policy version table (Y of step S302), the check data inspecting unit 33 checks whether the device version number extracted from the check data is in the device version table stored in the inspection check information storage unit 32 (step S303). If the extracted policy version information is not in the policy version table (N of step S302), the process proceeds to step S306.

If the extracted device version number is in the device version table (Y of step S304), the check data inspecting unit 33 sets comparison result flag=1 (transmission permitted). If the extracted device version number is not in the device version table (N of step S304), the process proceeds to step S306.

In a process of step S306, the check data inspecting unit 33 sets comparison result flag=0 (transmission rejected).

Figure 13:
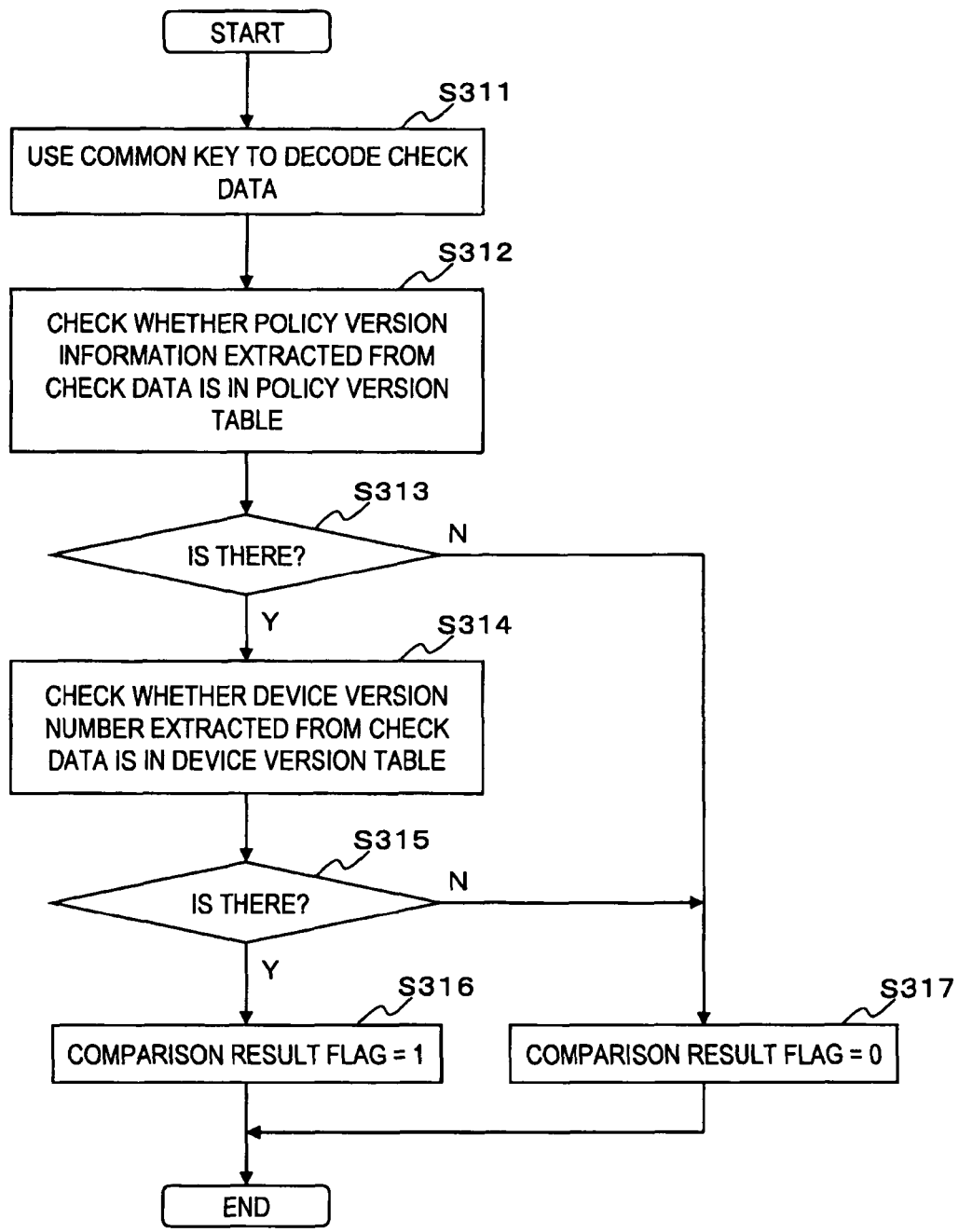
FIG. 13 is a more detailed processing flow diagram of the comparison process of check data (step S22) when the check data is encoded.

FIG. 13 is a more detailed processing flow diagram of the comparison process of check data (step S22) when the check data is encoded.

The check data inspecting unit 33 executes a decoding process corresponding to the encoding process executed by the check data generating unit 23 of the check data providing apparatus 2 and uses predetermined data designated as a common key to decode the encoded check data (step S311). The check data inspecting unit 33 then executes processes of steps S312 to S317 for the decoded check data. The processes of steps S312 to S317 of FIG. 13 correspond to the processes of steps S301 to S306 of FIG. 12, respectively.

Figure 14:
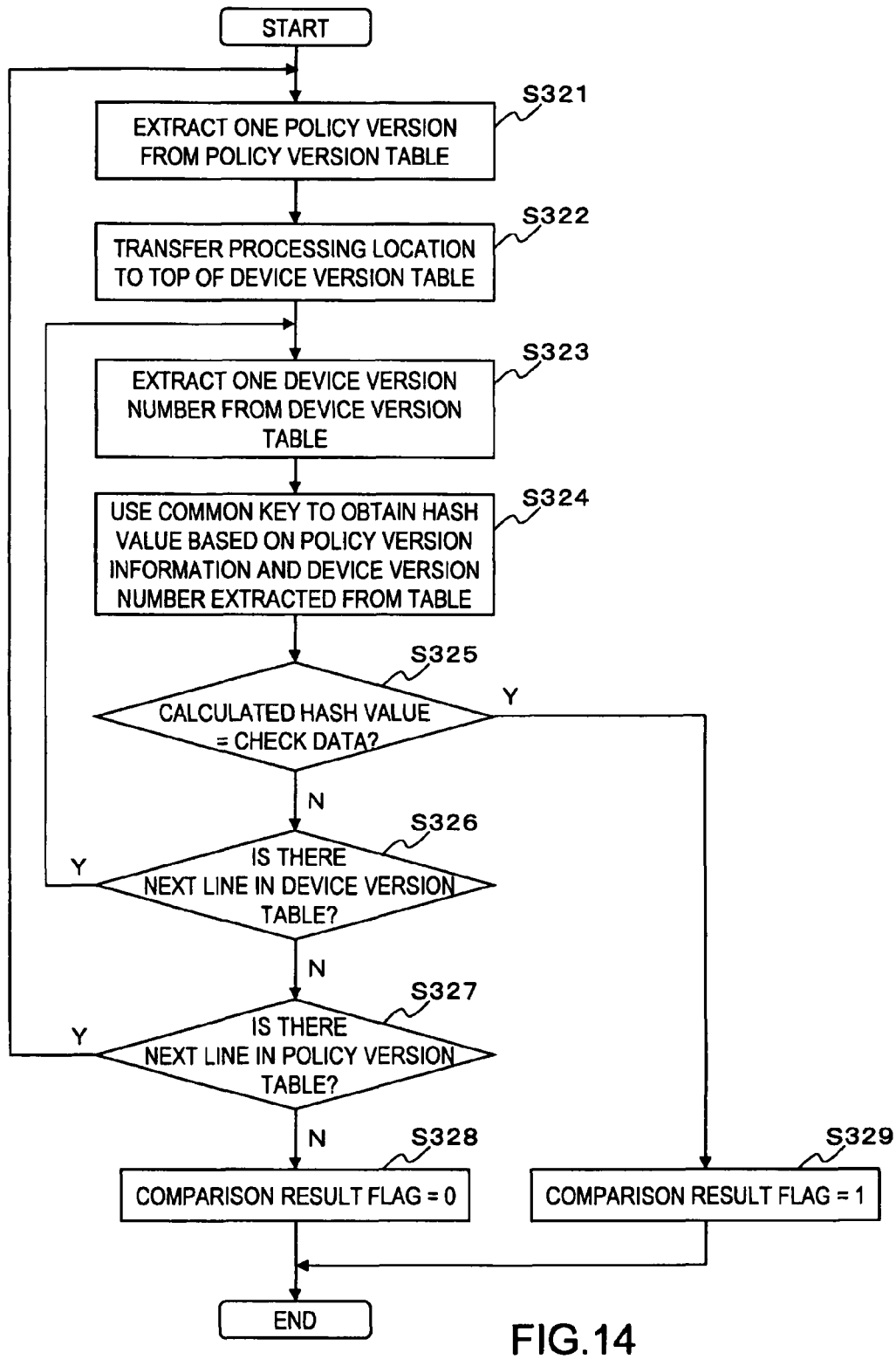
FIG. 14 is a more detailed processing flow diagram of the comparison process of check data (step S22) when the check data is hashed.

FIG. 14 is a more detailed processing flow diagram of the comparison process of check data (step S22) when the check data is hashed.

The check data inspecting unit 33 extracts one piece of policy version information from the policy version table stored in the inspection check information storage unit 32 (step S321). The check data inspecting unit 33 further moves to the top of the device version table stored in the inspection check information storage unit 32 (step S322) and extracts one device version number in the line after the movement in the device version table (step S323).

The check data inspecting unit 33 then uses a common key based on the policy version information and the device version number to obtain a hash value (step S324). If the calculated hash value does not match the check data of the planned outgoing email (N of step S325), the process proceeds to step S326. If the calculated hash value matches the check data of the planned outgoing email (Y of step S325), the process proceeds to step S329.

If there is a next line in the device version table in the process of step S326 (Y of step S326), the process returns to S323, and the check data inspecting unit 33 repeats the processes after step S323. On the other hand, when there is no next line in the device version table (N of step S326), the process proceeds to step S327.

If there is a next line in the policy version table in the process of step S327 (Y of step S327), the process returns to step S321, and the check data inspecting unit 33 repeats the processes after step S321. On the other hand, when there is no next line in the device version table (N of step S327), the process proceeds to step S328.

In a process of step S328, the check data inspecting unit 33 sets comparison result flag=0 (transmission rejected).

In a process of step S329, the check data inspecting unit 33 sets comparison result flag=1 (transmission permitted).

Although the case has been mainly described, in which the invention made by the inventor of the present invention is applied to the email wrong transmission prevention process in a background technical field, the application is not limited to this. It is obvious that various changes can be made within the scope of the description.

For example, the check data providing apparatus 2 may be included inside the security check executing apparatus 5. The security check executing apparatus 5 may be included inside the check data providing apparatus 2.

The check information management apparatus 1, the check data providing apparatus 2, the check data inspecting apparatus 3, and the security check executing apparatus 5 that constitute the outgoing email check system 100 can be carried out by a computer including a CPU, a main storage unit (memory), an input/output interface, an external storage device, etc.

The processing units of the check information management apparatus 1, the check data providing apparatus 2, and the check data inspecting apparatus 3 as well as the security check executing apparatus 5 can be carried out by programs that can be executed by computers. In this case, programs describing processing contents of functions that the apparatuses of the check information management apparatus 1, the check data providing apparatus 2, the check data inspecting apparatus 3, and the security check executing apparatus 5 should have are provided. Computers execute the provided programs, and the processing functions of the apparatuses are realized on the computers.

The computers that carry out the check information management apparatus 1, the check data providing apparatus 2, the check data inspecting apparatus 3, and the security check executing apparatus 5 can directly read out the programs from a portable recording medium to execute processes in accordance with the programs. Alternatively, the computers can sequentially execute processes in accordance with a received program every time the program is transferred from a server computer.

Furthermore, the programs for realizing the check information management apparatus 1, the check data providing apparatus 2, the check data inspecting apparatus 3, and the security check executing apparatus 5 can be recorded in a computer-readable recording medium.

All examples and conditional language recited herein are intended for pedagogical purposes to aid the reader in understanding the invention and the concepts contributed by the inventor to furthering the art, and to be construed as being without limitation to such specifically recited examples and conditions, nor does the organization of such examples in the specification relate to a showing of the superiority and inferiority of the invention. Although the embodiment(s) of the present invention have been described in detail, it should be understood that the various changes, substitutions, and alterations could be made hereto without departing from the spirit and scope of the invention.

The invention claimed is:

1. An outgoing email check system to inspect the execution of a security check process for an outgoing email, the outgoing email check system comprising:
 a security check executing apparatus; a check data providing apparatus; and a check data inspecting apparatus,
  the security check executing apparatus acquiring a planned outgoing email to be transmitted to an email transmitting apparatus and executing the security check process based on a predetermined policy version of security management for the acquired planned outgoing email,
  the check data providing apparatus including
   a first memory that stores sender-by-sender check information, which is received from a check information management apparatus, including an arbitrary value allocated to a sender, and
   a first processor to execute
    receiving the planned outgoing email for which the security check process is executed,
    generating check data including a check value generated from the arbitrary value allocated to the sender of the planned outgoing email based on the sender-by-sender check information,
    appending the check data to a header of the received planned outgoing email, and
    transmitting the planned outgoing email with the appended check data to the email transmitting apparatus,
  the check data inspecting apparatus including:
   a second memory that stores
    the sender-by-sender check information,
    inspection check information including policy version information indicating content of the security check process to be executed for the planned outgoing email, and
    transmission rejection information indicating the planned outgoing email for which the transmission is rejected,
   wherein the sender-by-sender check information and the inspection check information are received from the check information management apparatus,
   and a second processor to execute
    acquiring the planned outgoing email from the email transmitting apparatus,
    extracting the check data from the header of the acquired planned outgoing email,
    inspecting the extracted check data by evaluating the extracted check data in accordance with the sender-by-sender check information and the inspection check information, which are stored in the second memory, determining a permission or rejection of transmission of the acquired planned outgoing email based on a result of the inspecting, returning the acquired planned outgoing email to the email transmitting apparatus when a permission of the transmission of the acquired planned outgoing email is determined, and generating transmission rejection information of the acquired planned outgoing email and recording the transmission rejection information in the second memory when a rejection of the transmission of the acquired planned outgoing email is determined.

2. The outgoing email check system according to claim 1, comprising
a check information management apparatus including:
a third memory that stores the sender-by-sender check information and the inspection check information, and
a third processor to execute
distributing the sender-by-sender check information stored in the third memory to the check data providing apparatus and the check data inspecting apparatus and distributing the sender-by-sender check information and the inspection check information to the check data inspecting apparatus.

3. The outgoing email check system according to claim 1, wherein
the first processor in the check data providing apparatus executes encoding the check data based on both information extracted from the header of the received planned outgoing email and the sender-by-sender check information stored in the first memory, and
the second processor in the check data inspecting apparatus executes decoding the encoded check data based on both the information extracted from the header of the received planned outgoing email and the sender-by-sender check information stored in the second memory.

4. The outgoing email check system according to claim 1, wherein
the second processor of the check data inspecting apparatus executes
extracting sender information of the planned outgoing email transmitted to the email transmitting apparatus when the rejection of the transmission of the acquired planned outgoing email is determined and
providing, using the extracted sender information, notification of the transmission rejection of the planned outgoing email.

5. A check data inspecting apparatus included in an outgoing email check system including a security check executing apparatus that acquires a planned outgoing email to be transmitted to an email transmitting apparatus and executes a security check process for the acquired planned outgoing email, the check data inspecting apparatus comprising:
a memory that stores
sender-by-sender check information, which is received from a check information management apparatus, including an arbitrary value allocated to a sender,
inspection check information including policy version information indicating content of the security check process to be executed for the planned outgoing email, and
transmission rejection information indicating a planned outgoing email for which a transmission is rejected; and
a processor to execute
acquiring the planned outgoing email from the email transmitting apparatus, the planned outgoing email undergoing a security check process based on a predetermined policy version of security management, and including check data generated by a security check executing apparatus, extracting the check data including a check value generated from the arbitrary value allocated to the sender of the planned outgoing email from a header of the acquired planned outgoing email, inspecting the extracted check data by evaluating the extracted check data in accordance with both the sender-by-sender check information and the inspection check information, determining permission or rejection of the transmission of the acquired planned outgoing email based on a result of the inspecting, returning the acquired planned outgoing email to the email transmitting apparatus when a permission of the transmission of the acquired planned outgoing email is determined, and generating transmission rejection information of the acquired planned outgoing email and recording the transmission rejection information in the memory when a rejection of the transmission of the acquired planned outgoing email is determined.

6. The check data inspecting apparatus according to claim 5, wherein
when the check data appended to the planned outgoing email is encoded, the processor executes decoding the encoded check data based on both the information extracted from the header of the planned outgoing email and the sender-by-sender check information stored in the memory to inspect the decoded check data.

7. The check data inspecting apparatus according to claim 5, wherein the processor executes
extracting sender information of the planned outgoing email transmitted to the email transmitting apparatus when the rejection of the transmission of the acquired planned outgoing email is determined, and
providing, using the extracted sender information, notification of the transmission rejection of the planned outgoing email.

8. An outgoing email check method to inspect the execution of a security check process for a planned outgoing email, the outgoing email check method executed by a first computer and a second computer,
the first computer including:
a memory that stores sender-by-sender check information, which is received from a check information management apparatus, including an arbitrary value allocated to a sender, and
the second computer including:
a memory that stores
the sender-by-sender check information received from the check information management apparatus, and
inspection check information including policy version information indicating content of the security check process to be executed for the planned outgoing email, the sender-by-sender check information and the inspection check information being received from the check information management apparatus; and
transmission rejection information indicating the planned outgoing email for which a transmission is rejected, the outgoing email check method comprising:

acquiring, using the first computer, a planned outgoing email to be transmitted to an email transmitting apparatus, executing, using the first computer, a security check process based on a predetermined policy version of security management for the acquired planned outgoing email;

generating, using the first computer, check data including a check value generated from the arbitrary value allocated to the sender of the planned outgoing email based on the sender-by-sender check information stored in the memory of the first computer;

appending, using the first computer, the generated check data to a header of the planned outgoing email for which the security check process is executed;

transmitting, using the first computer, the planned outgoing email with the appended check data to the email transmitting apparatus;

acquiring, using the second computer, the planned outgoing email from the email transmitting apparatus;

extracting, using the second computer, the check data from the header of the acquired planned outgoing email;

inspecting, using the second computer, the extracted check data based on the inspection check information stored in the memory of the second memory and determining permission or rejection of the transmission of the acquired planned outgoing email based on a result of the inspecting;

returning, using the second computer, the acquired planned outgoing email to the email transmitting apparatus when the permission of transmission of the acquired planned outgoing email is determined; and generating, using the second computer, transmission rejection information of the acquired planned outgoing email and recording the transmission rejection information in the memory of the second computer when the rejection of the transmission of the acquired planned outgoing email is determined.

9. A non-transitory computer-readable medium storing a check data inspection program included in an outgoing email check system to inspect the execution of a security check process for an outgoing email, the check data inspecting program causing a computer including a memory to execute a process comprising:

acquiring a planned outgoing email from an email transmitting apparatus;

extracting check data from a header of an acquired planned outgoing email;

inspecting the extracted check data by evaluating the check data in accordance with both sender-by-sender check information and inspection check information;

determining permission or rejection of a transmission of the acquired planned outgoing email based on a result of the inspecting;

returning the acquired planned outgoing email to the email transmitting apparatus when the permission of the transmission of the acquired planned outgoing email is determined; and generating transmission rejection information of the acquired planned outgoing email and recording the transmission rejection information in the memory when the rejection of the transmission of the acquired planned outgoing email is determined, wherein the memory stores the sender-by-sender check information, received from a check information management apparatus, including an arbitrary value allocated to the sender, the inspection check information including policy version information indicating the content of the security check process to be executed for the planned outgoing email, and the transmission rejection information indicating the planned outgoing email for which the transmission is rejected, and wherein, upon generation, the check data includes a check value generated from the value allocated to the sender of the planned outgoing email.

* * * * *